April 13, 1937.                D. R. DE TAR                2,076,625
REDUCTION GEAR DEVICE
Filed Feb. 28, 1934
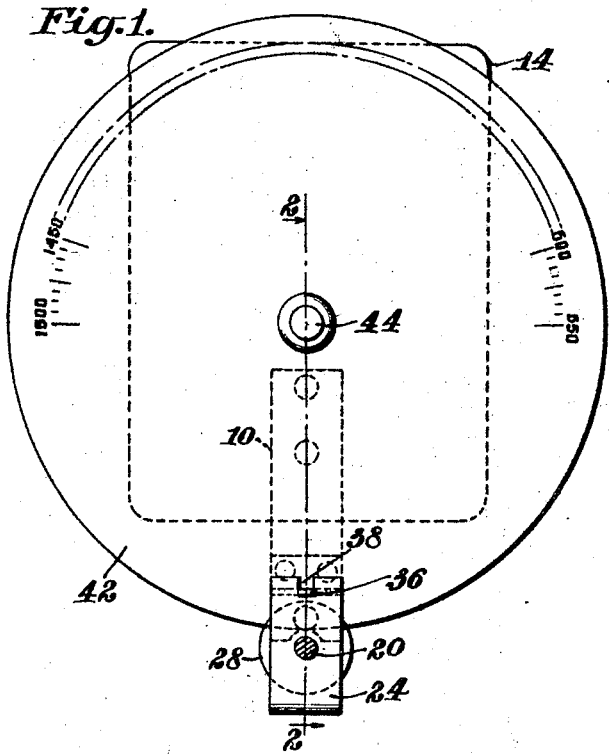
Fig. 1.
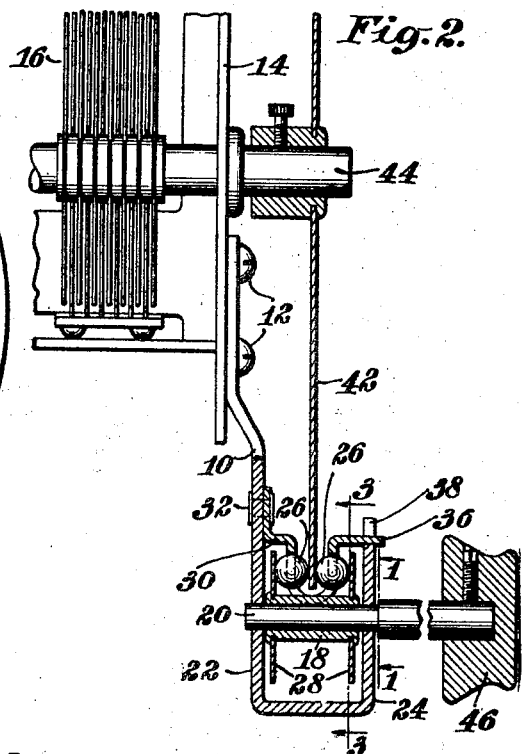
Fig. 2.
Fig. 3.
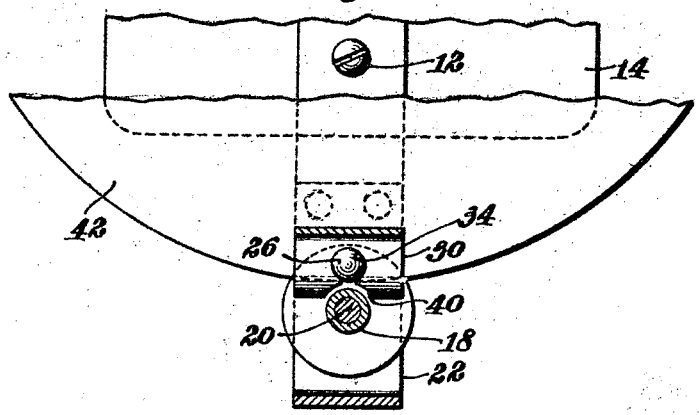
Fig. 4.
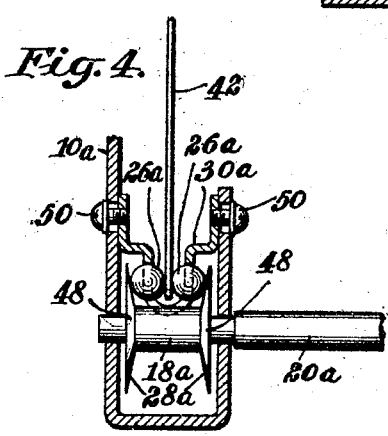
INVENTOR:
Donald R. De Tar,
BY T. R. Goldsborough
HIS ATTORNEY.

Patented Apr. 13, 1937

2,076,625

UNITED STATES PATENT OFFICE 2,076,625

REDUCTION GEAR DEVICE

Donald R. De Tar, Audubon, N. J., assignor to Radio Corporation of America, a corporation of Delaware Application February 28, 1934, Serial No. 713,266

3 Claims. (Cl. 74—10)

My invention relates to improvements in reduction-gear devices for making fine adjustments of mechanical members, and more particularly to a device of this character for making incremental adjustments of a variable capacitor in a short-wave radio receiver.

One of the objects of my invention is to provide an improved device of the character referred to which is reliable in operation, which can be easily applied as a unit to tuning condensers of standard construction, which can be manufactured and assembled at relatively low cost, and which is devoid of backlash.

Other objects and advantages will hereinafter appear.

For the purpose of illustrating my invention, an embodiment thereof is shown in the drawing, wherein Figure 1 is a front elevational view, partly in section, showing my improved device applied to a tuning condenser, the section being taken on the line 1—1 in Fig. 2;

Fig. 2 is an enlarged, fragmentary, sectional view, the section being taken on the line 2—2 in Fig. 1;

Fig. 3 is a fragmentary, sectional view, the section being taken on the line 3—3 in Fig. 2; and Fig. 4 is a fragmentary, sectional view, similar to Fig. 2, showing a modification.

As shown more clearly in Fig. 2, my improved device comprises a U-shape supporting member 10 secured by screws 12 to the front plate 14 of a variable capacitor or tuning condenser 16 in a radio receiver. A spool 18 is fixed on a shaft 20 which is journaled in the spaced, parallel sides 22 and 24 of the member 10.

Complementary rotor elements, in the form of balls 26, are supported between the ends 28 of the spool, and on the same side of the axis of rotation of the latter in line, parallel to the axis.

The supporting means for the balls 26 is in the form of a U-shape retainer member 30 fixed to the member 10 by rivets 32, and provided in the U with circular holes 34 in which the balls 26 have a free running fit. A tongue 36 extending outwardly from the free end of the member 30 fits snugly in a notch 38 in the member 10, whereby this end of the retainer 30 is fixed against relative movement with respect to the member 10.

As shown more clearly in Fig. 3, the bottom of the member 30 is cut away at 40 to accommodate the spool 18.

In applying my improved device to the condenser, the edge of a disc 42, fixed on the condenser shaft 44, is inserted between the balls 26. The distance between the spool ends 28 is made slightly less than twice the diameter of one of the balls 26, plus the thickness of the disc 42, so that insertion of the edge of the disc 42 between the balls 26 must be forced, whereupon the spool ends 28, which are made of spring material, are flexed slightly outwardly. With the parts assembled, therefore, the balls 26 are held in frictional driving engagement with the opposite faces of the disc 42 and the frictional driving surfaces of the spool ends 28 by the spring action of the latter.

In making an adjustment, the shaft 20 is rotated by a knob 46 fixed thereon. Due to the frictional driving engagement between the inner faces of the spool ends 28 and the balls 26, the latter are then caused to rotate about fixed axes each perpendicular to the axis of rotation of the spool, the free running fit of the balls in the retainer 30 permitting this. The rotor plates of the condenser 16 are then caused to rotate by reason of the frictional driving engagement between the balls and the respective opposite faces of the disc 42. The relation between the angle through which the condenser plates are rotated and the angle through which the shaft 20 is rotated is equal to the relation between the distance from the axis of shaft 20 to the point of contact of the balls 26 with the disc 42, and the distance from this point to the axis of the shaft 44. From this it will be seen that a substantial reduction is obtained, so that very fine adjustments of the condenser 16 can be made by turning the knob 46 through a small angle. As represented in the drawing, there is a reduction of about ten to one between the shafts 20 and 44.

As represented in Fig. 2, the spool 18 may comprise a bushing having reduced ends upon which are placed the spool ends 28 in the form of discs of spring material, after which the ends of the bushing are riveted over to hold the parts rigidly together.

In the embodiment of my invention shown in Fig. 4, the spool 18a, corresponding to the spool 18 in Fig. 2, is made in a single piece, and is machined directly on the end of the driving shaft 20a. The spool ends 28a are not as flexible as the spool ends 28 in Fig. 2, and are formed with the inner faces 48 sloping radially inwardly, as shown, to receive the balls 26a. The retainer member 30a, corresponding to the member 30 in Fig. 2, is secured at its ends by screws 50 to the U-shape supporting member 10a, and is positioned so that the balls are held down into firm frictional engagement with the faces 48. In this connection, the retainer 30a may be slightly resilient to prevent binding of the parts, while at the same time ensuring a good frictional driving engagement between the balls, the faces 48 and the disc 42. In this modification, the manner of operation is the same as that in Fig. 2. As shown in Fig. 1, the disc 42 is the dial plate for indicating the frequency for which the condenser is tuned in the respective positions thereof.

From the foregoing it will be seen that I have provided an improved reduction-gear device which is particularly adapted for making fine adjustments of a tuning condenser in a radio receiver, which is relatively simple and reliable in operation, and which can be manufactured as a unit and applied to a condenser of standard construction.

Although but one embodiment of my invention has been shown and described, it will be understood that various modifications thereof, within the conception of those skilled in the art, can be made without departing from the spirit of my invention or the scope of the claims.

I claim as my invention:

1. A reduction-gear device for adjusting electrical tuning apparatus provided with an actuating member, said device comprising a U-shape supporting member, a driving member in the form of a spool journaled in said supporting member for rotation about an axis transverse thereto and provided with end pieces having frictional driving surfaces, a pair of balls disposed between said surfaces on the same side of said axis, a U-shape ball retainer extending across said supporting member from side to side thereof and provided with openings in which said balls are disposed and have a free running fit for rotation about substantially parallel axes each substantially perpendicular to the axis of rotation of said spool, said ball-race having at least one end thereof fixed to a side of said supporting member, said device being adapted to receive an edge of said actuating member between said balls whereby frictional driving engagement is made and maintained between said balls and the respective opposite faces of said edge and between said balls and said surfaces, and means for rotating said spool.

2. The combination with tuning apparatus having a tuning shaft of a disc-like actuating member fixed on said shaft, a supporting member fixed to said tuning apparatus, a driving member in the form of a spool journaled in said supporting member for rotation about an axis parallel to said tuning shaft, said spool having oppositely located frictional driving surfaces sloping radially inwardly, a pair of balls disposed between said inwardly sloping surfaces, a U-shape ball retainer fixed to said supporting member and provided with openings in which said balls are disposed and have a free running fit, the distance between said inwardly sloping surfaces of said spool being such that upon insertion of said disc-like actuating member between said balls the latter are caused to make frictional driving engagement with the respective opposite faces of said disc, and with the respective opposite inwardly sloping surfaces of said spool, and means for rotating said spool.

3. The combination with tuning apparatus having a tuning shaft, of a disc-like actuating member fixed on said shaft, a supporting member fixed to said tuning apparatus, a drive member supported on said supporting member for rotation about an axis substantially parallel to said tuning shaft and provided with flexible spaced driving elements of spring material, a pair of balls disposed between said flexible driving elements, a U-shape ball retainer fixed to said supporting member and provided with openings in the respective opposite arms of the U in which said balls are disposed for rotation about substantially parallel axes each substantially perpendicular to the axis of rotation of said drive member, said drive member being adapted to receive said disc-like actuating member between said balls with a force fit whereby said driving elements are flexed to maintain a frictional driving engagement between said balls and the respective opposite faces of said disc, and means for rotating said drive member.

DONALD R. DE TAR.